(12) United States Patent
Yamauchi

(10) Patent No.: US 8,081,356 B2
(45) Date of Patent: Dec. 20, 2011

(54) IMAGE READING APPARATUS

(75) Inventor: Tsuyoshi Yamauchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 12/363,433

(22) Filed: Jan. 30, 2009

(65) Prior Publication Data

US 2009/0190190 A1 Jul. 30, 2009

(30) Foreign Application Priority Data

Jan. 30, 2008 (JP) ................... 2008-018782

(51) Int. Cl.
*H04N 1/04* (2006.01)
(52) U.S. Cl. ......... 358/497; 358/474; 358/494; 358/483
(58) Field of Classification Search .............. 358/497, 358/494, 474, 471, 483, 482, 505, 514; 399/211, 399/212; 250/234–236, 208.1, 239
See application file for complete search history.

(56) References Cited

U.S. PATENT DOCUMENTS

| 6,888,651 | B2 * | 5/2005 | Lee ................................. 358/497 |
| 7,253,930 | B2 | 8/2007 | Hendrix |
| 7,385,736 | B2 * | 6/2008 | Tseng et al. .................. 358/497 |
| 7,486,423 | B2 * | 2/2009 | Chang et al. .................. 358/497 |
| 7,768,679 | B2 * | 8/2010 | Yamaguchi .................... 358/497 |

* cited by examiner

*Primary Examiner* — Cheukfan Lee

(57) ABSTRACT

An image reading apparatus for reading a document placed on a document positioning plate using a reading sensor unit mounted on a carriage includes a rack member provided in an apparatus body and having rack teeth provided along the moving direction of the carriage, a pinion gear rotatably disposed on the carriage and meshed with the rack teeth, a motor mounted on the carriage and driving the pinion gear, an urging member disposed between the carriage and the reading sensor unit and urging the reading sensor unit toward the document positioning plate, a guide rail provided in the apparatus body and guiding movement of the carriage, and a guide portion provided on the carriage and engaged with the guide rail, wherein the guide portion is pressed toward the guide rail by receiving a reaction force of the urging member at the carriage.

10 Claims, 12 Drawing Sheets

IMAGE READING APPARATUS

BACKGROUND OF THE INVENTION

1. Field of the Invention

The present invention relates to an image reading apparatus for reading a document placed on a document positioning glass plate with a reading sensor unit mounted on a carriage.

2. Description of the Related Art

An image reading apparatus, such as a facsimile machine, reads a document placed on a document positioning glass plate with a reading sensor unit mounted on a carriage. A conventional image reading apparatus has a configuration in which a carriage including a reading sensor unit is movably guided and supported along a guide shaft formed with a metal shaft and moved by a motor provided in the apparatus. In this case, the apparatus generally has a drive transmission mechanism for the carriage, which transmits a driving force of the motor to the carriage via a gear, a timing belt, and the like. In recent years, a type for making the carriage to self-run along a rack member is used instead of the guide shaft. This type of image reading apparatus needs to have an urging member which is located opposite rack teeth of the rack member and regulates a horizontal position of the carriage to prevent play or backlash of the carriage caused by a reaction force acting on a meshing portion between the rack teeth and a pinion gear.

FIG. 9 is a plan view when a document cover of a conventional image reading apparatus is opened. FIG. 10 is a transverse cross sectional view of a conventional rack member and a sliding portion of a slider. FIG. 11 is a partial plan view of a drive mechanism for a carriage illustrated in FIG. 9. FIG. 12 is a transverse cross sectional view of a sliding portion having an urging member for reducing backlash between the rack member and the slider in FIG. 10. The image reading apparatus includes an apparatus body 101 for housing and holding various types of functional parts, a document positioning glass plate 102 for placing a document, a reading sensor 103 having a contact image sensor for reading an image of a document, and a carriage 104 including the image sensor 103 thereon and movable.

The image reading apparatus further includes a slider 105 fixed on the lower side of the carriage 104, a rack member 106 provided along the Y-direction of the apparatus body 101, and a carriage driving motor 107 mounted on the carriage 104. The carriage 104 moves while causing the slider 105 to contact and slide on a guide rail 121 provided at the rack member 106. The rack member 106 has rack teeth 122 formed over the approximately whole length thereof. The carriage 104 has a pinion gear 108, which is meshed with the rack teeth 122 and rotatably supported. The carriage 104 is a self-run type. More specifically, the driving force from the motor 107 is transmitted to the pinion gear 108 via a motor gear 124, an idler gear 125, and a worm gear 126. Further, the carriage 104 moves in the Y-direction along the rack member 106 by moving and rolling the pinion gear 108 on the rack teeth 122. The carriage 104 moves back and forth along the rack member 106 in response to the normal/reverse rotation of the motor 107.

The rack member 106 has a guide rail 121, on which the slider 105 slides when the carriage 104 moves. The guide rail 121 includes a vertical directional contacting portion 106a and a horizontal directional contacting portion 106b, and the slider 105 can slide on these two portions. The vertical directional contacting portion 106a is formed on an upper face of the guide rail 106, and the horizontal directional contacting portion 106b is formed on a back face of the rack teeth 122 of the guide rail 106.

However, in the aforementioned image reading apparatus, when the pinion gear 108 rotates in the R direction in FIG. 11, the slider 105 receives a force for rotating a front end F in the arrow T direction via the carriage 104 by a reaction force at the time of meshing the pinion gear 108 with the rack teeth 122. As the length of the moving direction of the slider 105 (the interval between portions F and E in FIG. 11) decrease in order to reduce the size of the apparatus, the force in the arrow T direction increases. Thus, as illustrated in FIG. 10, a space S is formed at the front portion (portion F) of the slider 105 by separating the horizontal directional contacting portion 105b of the slider 105 from the horizontal directional contacting portion 106b of the rack member 106 due to the rotating force. As a result, the backlash of the carriage 104 occurs in the arrow B directions illustrated in FIG. 9 around a contacting point of the vertical directional contacting portion 105a of the slider 105 and the vertical directional contacting portion 106a of the guide rail 121 in the back portion (portion E) of the slider 105. Therefore, since the backlash occurs at both right and left ends of the reading sensor 103, a high-definition reading image is difficult to acquire.

As illustrated in FIG. 12, in order to solve the problems of the configuration in FIG. 10, a configuration, in which an urging member 109 urges the slider 105 in the arrow P direction, is employed. The urging member 109 is provided in the rack member 106 via a holder 110. That is, by urging the slider 105 toward the guide rail 121 by the urging member 109 of the rack member 106, the two horizontal directional contacting portions 105b disposed in the back and front portions of the slider 105 are made contact with the horizontal directional contacting portions 106b of the rack member 106 so as to remove the space S. However, the configuration using the urging force of the urging member 109 for reducing backlash is easily affected by external factors, such as frictional variation or driving load variation, at the time of moving the carriage, and thus it is difficult to keep a stable running without backlash. Further, since the urging member 109 urges the slider 105, the driving load of the carriage 104 increases. Recently, a reading rate has remarkably improved so that increasing of the driving load is undesirable to improve the reading rate. Furthermore, since this configuration requires the urging member 109 and the holder 110, it has become one of the factors of cost increase.

SUMMARY OF THE INVENTION

The present invention is directed to an image reading apparatus capable of obtaining high-quality reading images by preventing backlash from occurring at the time of moving a reading sensor unit.

According to an aspect of the present invention, an image reading apparatus for reading a document placed on a document positioning plate using a reading sensor unit mounted on a carriage includes a rack member provided in an apparatus body and having rack teeth provided along the moving direction of the carriage, a pinion gear rotatably disposed on the carriage and meshed with the rack teeth, a motor mounted on the carriage and driving the pinion gear, an urging member disposed between the carriage and the reading sensor unit and urging the reading sensor unit toward the document positioning plate, a guide rail provided in the apparatus body and guiding movement of the carriage, and a guide portion provided on the carriage and engaged with the guide rail, wherein the guide portion is pressed toward the guide rail by receiving a reaction force of the urging member at the carriage.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
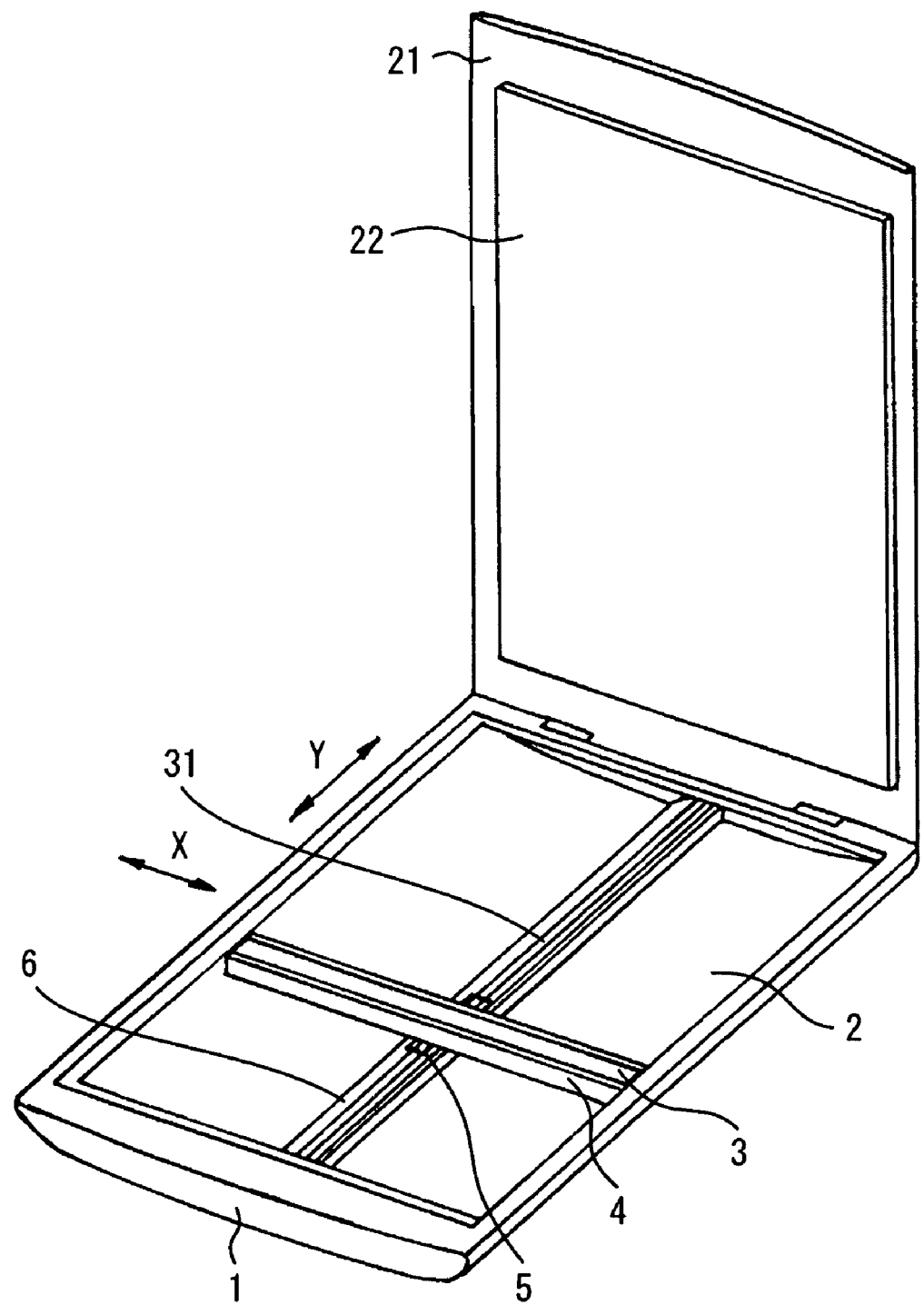
FIG. 1 is a perspective view of an image reading apparatus according to a first exemplary embodiment of the present invention when a document cover is opened.
Figure 2:
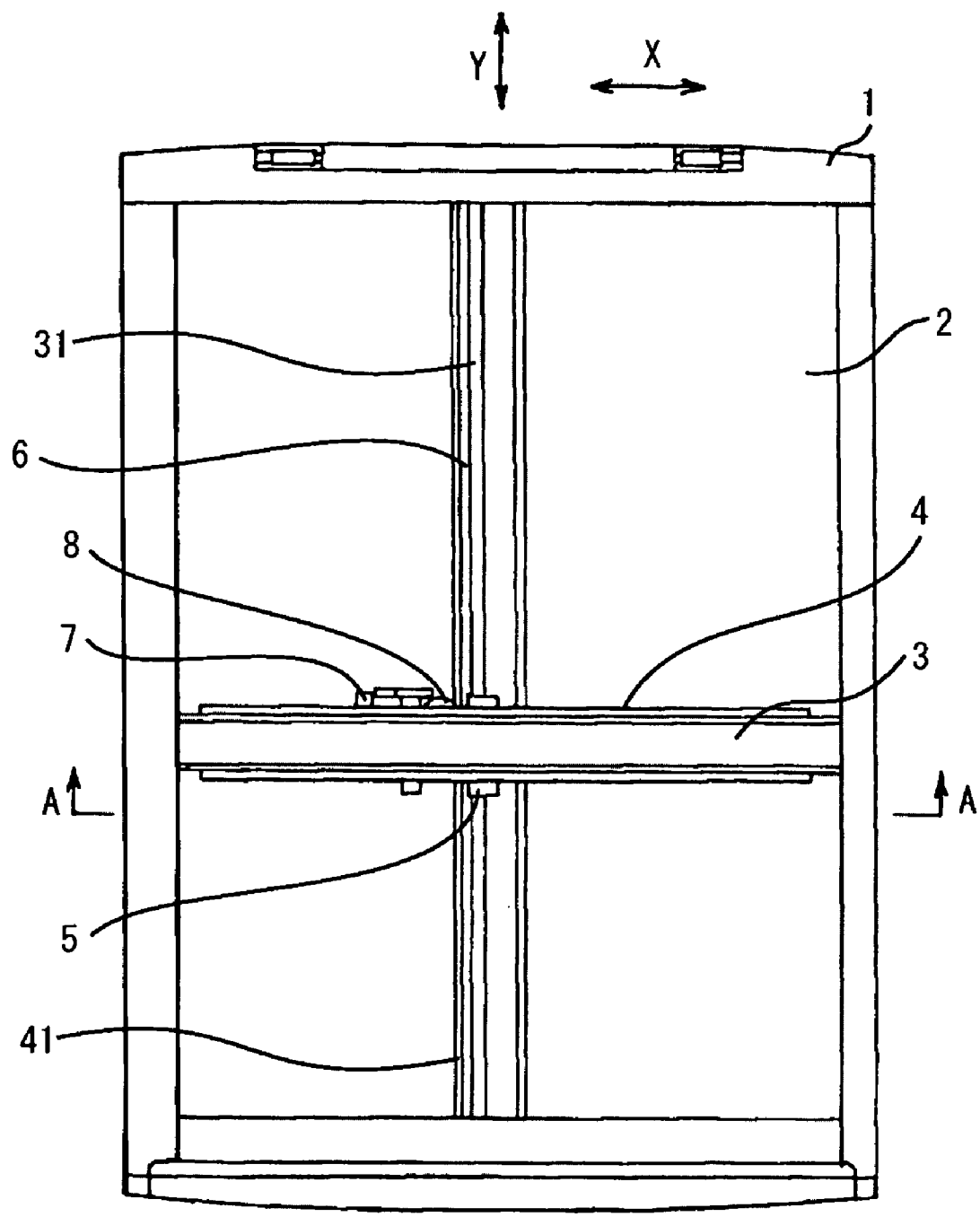
FIG. 2 is a plan view of an image reading apparatus according to the first exemplary embodiment.

FIG. 1 is a perspective view of an image reading apparatus according to a first exemplary embodiment of the present invention when a document cover is opened. FIG. 2 is a plan view of the image reading apparatus according to the first exemplary embodiment. An apparatus body 1 has a document positioning glass plate 2 for placing a document, which is attached on an upper face thereof. The document is set so that a reading image side thereof contacts the plate positioning glass plate 2. The apparatus body 1 has a reading sensor unit 3 provided inside thereof. The reading sensor unit 3 can move in the arrow Y direction along a lower face of the document positioning glass plate 2. The reading sensor unit 3 includes a contact image sensor arranged in the arrow X direction and is included in a carriage 4 similarly arranged along the arrow X direction. The carriage 4 is supported and guided to be movable back and forth in the arrow Y direction along the rack member 6 fixed in the apparatus body 1.

The apparatus body 1 has a document cover 21 capable of opening and closing as a pressing member for pressing a document placed on the document positioning glass plate 2 toward the upper face of the document positioning glass plate 2. On a pressing face of the document cover 21, a document pressing-sheet 22 including a sheet material and a sponge is bonded. The carriage 4 moves back and forth while sliding on a guide rail 31, which is integrally formed with the rack member 6, via the slider 5 fixed on a lower face of the carriage 4. Since the rack member 6 is fixed on the apparatus body side, the guide rail 31 is also fixed on the apparatus body side.

The reading sensor unit 3 moving together with the carriage 4 moves along the lower face of the document positioning glass plate 2 so as to read an image of the lower face of a document placed on the document positioning glass plate 2.

Figure 3:
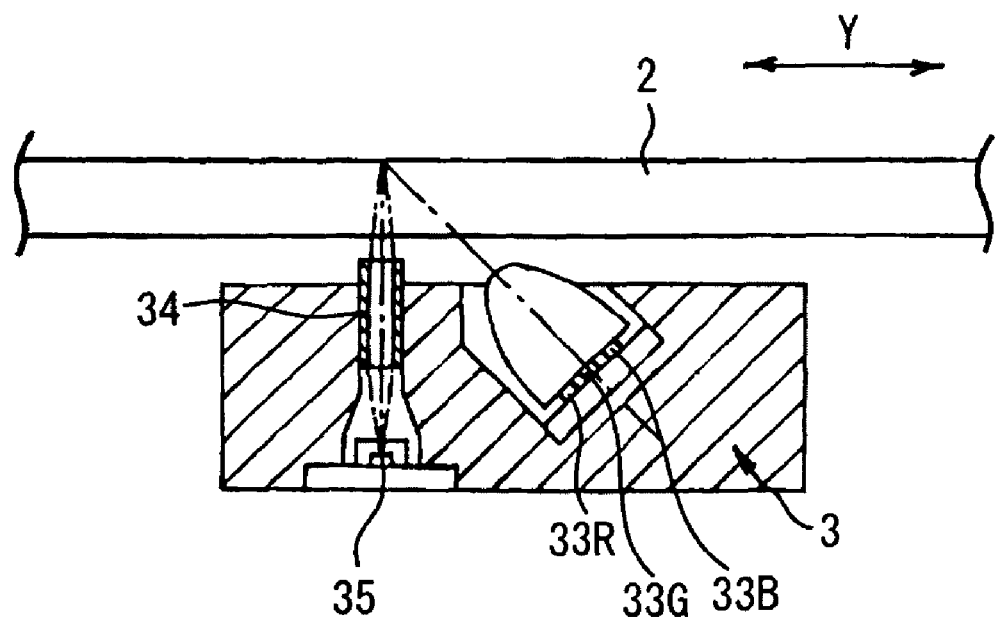
FIG. 3 is a cross sectional view of a reading sensor unit.

FIG. 3 is a cross sectional view of the reading sensor unit 3. The reading sensor unit 3 includes three-color light emitting diodes (LEDs) 33R, 33G and 33B, a rod lens array 34, and a light receiving element (image sensor) 35. Light irradiated from the LEDs 33R, 33G, and 33B on the document is reflected on the document face, and the reflected light passes through the rod lens array 34 to form an image on the image sensor 35. The reading sensor unit 3 switches on the three-color LEDs 33R, 33G, and 33B one by one, and the image sensor 35 reads the reflected light from the document for every color to perform color separation reading.

Figure 4:
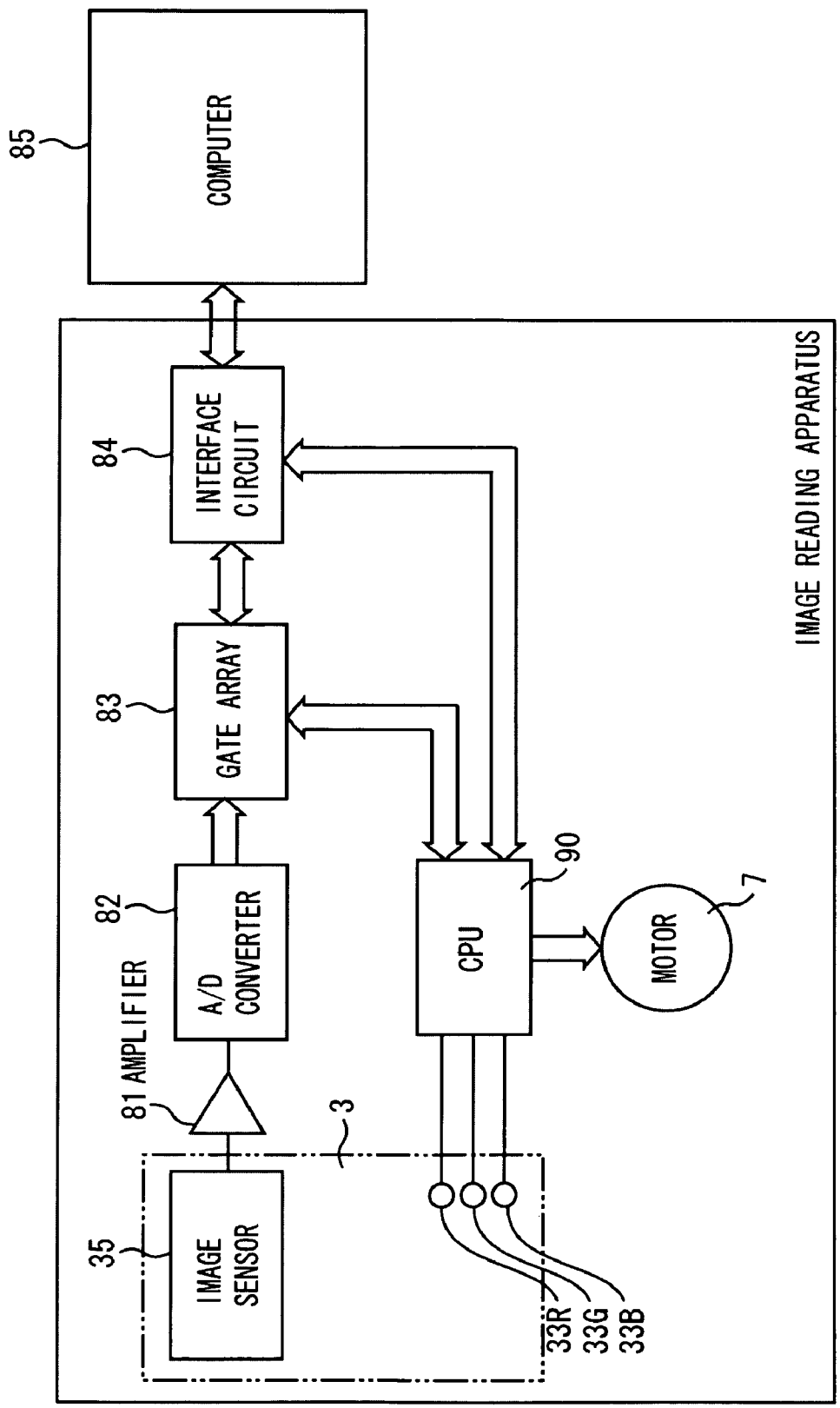
FIG. 4 is a block diagram of an image data processing unit in an image reading apparatus.

FIG. 4 is a block diagram of an image data processing unit in an image reading apparatus. An image output signal, which is read by the image sensor 35 in synchronization with on/off of each of the LEDs 33R, 33G, and 33B, is transmitted to an amplifier 81 to be amplified, and then converted into a digital image signal by an analog-to-digital (A/D) converter 82. The A/D converter 82 divides a dynamic range (reading output difference between a pure white part and a deep-black part on the document) of image sensors 35 into a number of bits that the A/D converter can divide and assigns a divided range to a level of gradation corresponding to a level of brightness of the image on the document. For example, when the A/D converter 82 having a resolution of 8 bits is used, 256 gradation levels of colors ranging from white to black can be identified, and when the A/D converter 82 having a resolution of 10 bits is used, 1024 gradation levels can be identified. Therefore, the image reading apparatus using the A/D converter 82 of 8 bits can identify 24 bits which are equal to approximately 16,700,000 colors by color-reading using the light sources of three colors of R, G, and B. Further, when the A/D converter 82 of 10 bits is used, the image reading apparatus can identify 30 bits, which are equal to approximately 1,074 million colors.

The image reading apparatus has several types of outputting modes of an image signal and a proper outputting mode can be selected according to the application of a reading image. When the image reading apparatus reads sentences to execute optical character recognition (OCR) or monochrome line drawings, a monochrome binary image outputting mode is suitable. In this case, an image processing circuit, which is formed in a gate array 83, uses image data, which is obtained by binarizing an image signal using a threshold, where the image signal is obtained by illuminating, for example, with only the G light source from among the aforementioned light sources of R, G, and B. When the image reading apparatus reads an image, such as a photograph, to output it to a monochrome printer, the image reading apparatus uses image data, which is obtained by binarizing an image signal using halftone processing, such as a dither method or an error diffusion method, where the image signal is acquired from the G source similarly. Further, when the image reading apparatus processes a color image, it is useful to use multi-value (e.g., 24 bits) image data. The image signal passed through the aforementioned image processing circuit is output to a device, such as a personal computer 85, via an interface circuit 84. In addition, operations of the reading sensor unit 3 and a driving motor 7 of the carriage 4 are controlled by a central processing unit (CPU) 90. Electric parts including a control board of the CPU 90 for controlling the operations and a power source is provided in the apparatus body 1.

Figure 5:
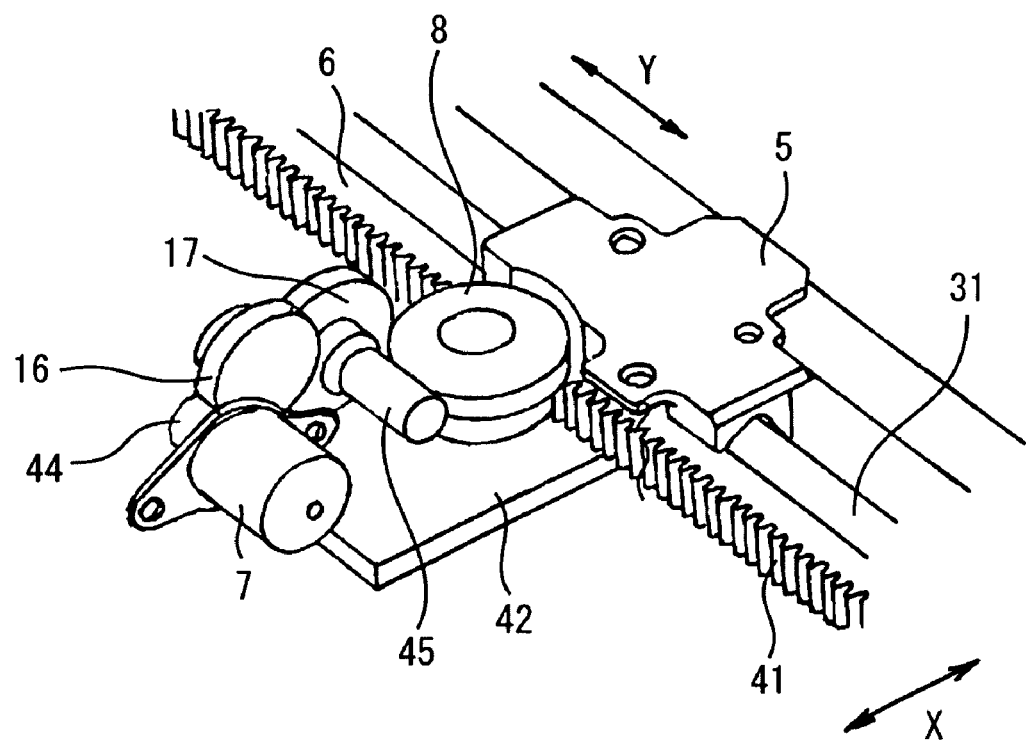
FIG. 5 is a perspective view illustrating a drive mechanism for a carriage according to the first exemplary embodiment where the carriage is omitted.
Figure 6:
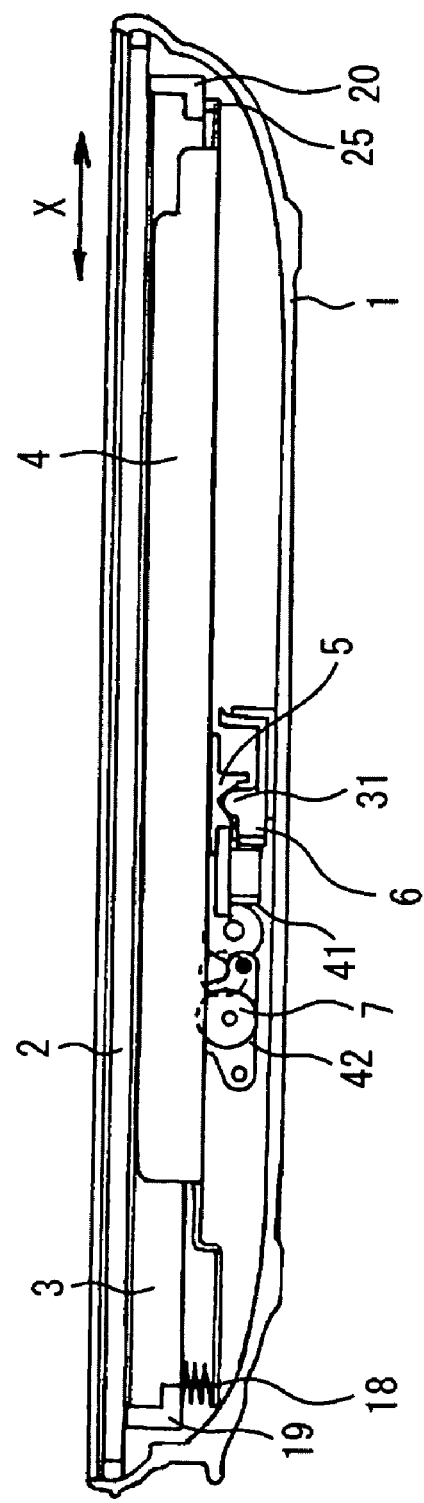
FIG. 6 is a transverse cross sectional view of an image reading apparatus taken along line A-A in FIG. 2.
Figure 7:
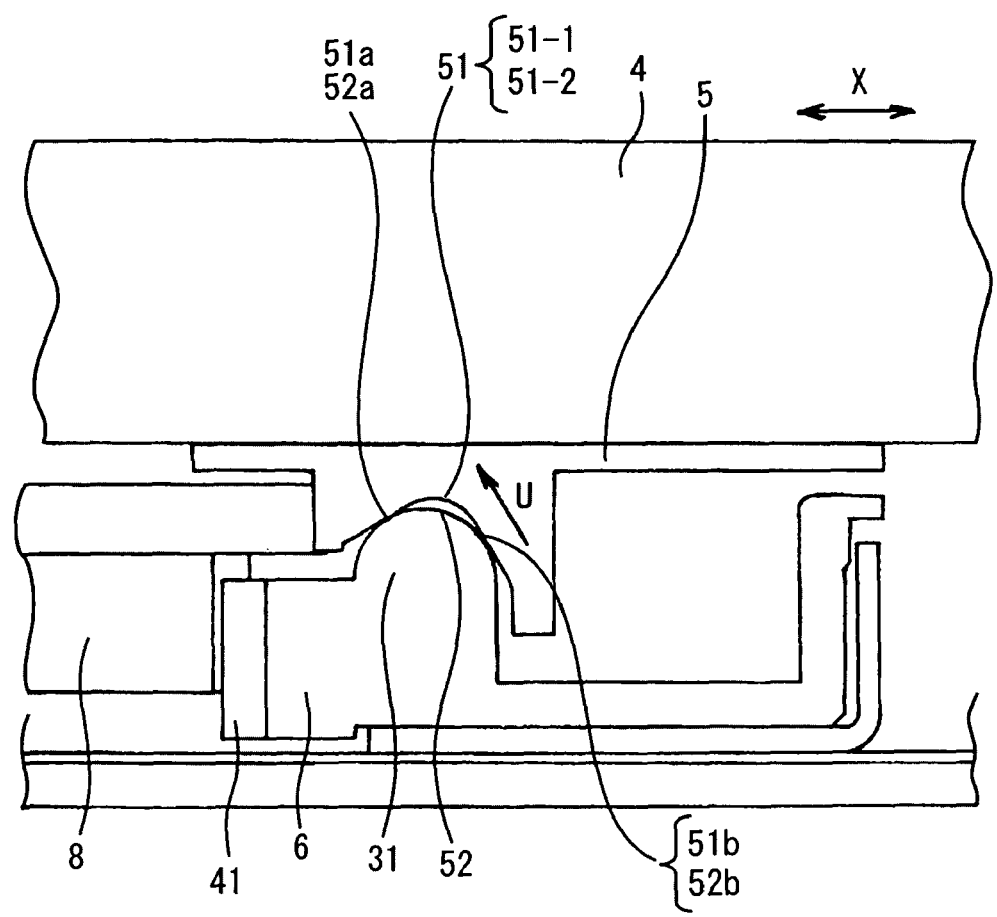
FIG. 7 is a transverse cross sectional view of a contact-sliding structure of a slider and a rack member according the first exemplary embodiment.

FIG. 5 is a perspective view illustrating a driving mechanism for the carriage 4 according to the first exemplary embodiment, in which the carriage 4 is omitted. FIG. 6 is a transverse cross sectional view of the image reading apparatus taken along line A-A in FIG. 2. FIG. 7 is a transverse cross sectional view of a sliding structure of the slider 5 and the rack member 6 according to the first exemplary embodiment.

The driving mechanism for the carriage 4 including the reading sensor unit 3 will be described. The rack member 6 fixed on the apparatus body 1 has rack teeth 41 formed approximately over the whole length thereof. The slider 5 and a supporting frame 42 are fixed on a lower face of the carriage 4 (a face on the opposite side of the document positioning glass plate 2), and the motor 7 serving as a driving source is attached on the supporting frame 42. The supporting frame 42 supports the pinion gear 8 rotatably meshed with the rack teeth 41. The rotation of the motor 7 is transmitted from a motor gear 44 to a worm gear 17 via an idler gear 16, and further transmitted to the pinion gear 8 via a worm wheel 45 formed integrally with the worm gear 17.

The pinion gear 8 rotates meshing with the rack teeth 41 of the rack member 6. A propulsive force, generated by the rotation force of the pinion gear 8, acts on the rack member 6, and thereby the carriage 4 moves with the propulsive force. The movement of the carriage 4 is guided in the arrow Y direction, illustrated in FIG. 5, by slide-engaging of the slider 5 and the guide rail 31, which is described below. That is, when the motor 7 is driven in response to a command from the CPU 90 (FIG. 4), the worm gear 17 is rotated via the idler gear 16 to transmit the driving force to the worm wheel 45, and the pinion gear 8 is rotated. The rotation force is transformed into the propulsive force of the rack member 6 and the reading sensor unit 3 included in the carriage 4 can self-run back and forth along the document positioning glass plate 2.

The reading sensor unit 3 is mounted on the carriage 4. The reading sensor unit 3 includes spacers 19 and 20 on both ends thereof. The spacers 19 and 20 assure a focus position by keeping a fixed distance between an upper face of the reading sensor unit 3 (a face on the document positioning glass plate 2 side) and a lower face of the document positioning glass plate 2 (a face on the reading sensor unit 3 side). At one end of the carriage 4 (the left end in FIG. 6), one end of the reading sensor unit 3 is pressed upward (toward the document positioning glass plate 2 side) by an elastic member (spring) 18 disposed between the reading sensor unit 3 and the carriage 4. Thereby, the spacer 19 is pressed toward the lower face of the document positioning glass plate 2. The carriage 4 includes supporting portion 25 at another end thereof (the right end in FIG. 6), and the supporting portion 25 contacts the lower face of another end of the reading sensor unit 3. The intermediate portion, in the horizontal directional, of the carriage 4 is supported by a contacting portion of the slider 5 fixed on the lower face of the carriage 4 and the guide rail 31 fixed on the apparatus body 1. According to this configuration, one end of the carriage 4 is urged downward by pressing reaction force of the elastic member 18. Further, another end of the reading sensor unit 3 is urged (pressed) toward the lower face of the document positioning glass plate 2 by contacting another end of the carriage 4 to another end of the reading sensor unit 3.

The reaction force of the pressing force upward of the elastic member 18 is supported in the balanced state by two supporting reaction forces, a supporting reaction force acting on the contacting portion of the slider 5 and the guide rail 31 at the intermediate portion, and a supporting reaction force acting from the document positioning glass plate 2 on the supporting portion 25 at another end via the spacer 20. By the balance of forces acting on the three portions, the reading sensor unit 3 is held on the carriage 4 in a fixed attitude while the spacers 19 and 20 respectively on each end are pressed toward the lower face of the document positioning glass plate 2. In addition, in the present embodiment, the guide rail 31 is formed integrally with the rack member 6. Therefore, the slider 5 fixed on the lower face of the carriage 4 is pressed and urged toward the rack member 6 by the reaction force for pushing-up the reading sensor unit 3 by the elastic member 18 and the self-weights of the reading sensor unit 3 and the carriage 4.

A sliding structure of the slider 5 and the rack member 6 will be described below with reference to FIG. 7. Concave portions 51 (51-1, 51-2) facing away from the document positioning glass plate 2 are provided at two portions having a predetermined interval in the moving direction of the slider 5. The concave portion 51 is formed to have an inverted V-shape including two inclined faces 51a and 51b. On the other hand, the guide rail 31 has a convex portion 52 facing the document positioning glass plate 2 and contacting the concave portions 51 of the slider 5 at two portions 52a and 52b. In the present embodiment, the guide rail 31 is provided near the rack teeth 41 of the rack member 6 and in parallel with the rack teeth 41, and formed integrally with the rack member 6. The convex portion 52 of the guide rail 31 slidably contacts the inclined face 51a and 51b of the concave portion 51 of the slider 5. In the present embodiment, the convex portion 52 has a circular shape. According to this configuration, the concave portions 51 of the slider 5 contact the convex portion 52 of the guide rail 31 at the two sliding portion 52a and 52b without backlash.

In addition, in the aforementioned contact-sliding structure, a reaction force of the driving force of the pinion gear 8 affects the carriage 4 so that a component force for raising the carriage 4 along the inclined portion of the slider 5 can occur in the arrow U direction in FIG. 7. However, the component force is comparatively low, about ten percent of the reaction force of the force for pushing-up the reading sensor unit 3 by the elastic member 18 and the pressing force by the self-weight. Thus, the component force does not cause a problem for moving the reading sensor unit 3 back and forth.

According to the aforementioned embodiment, the sensor unit 3 can be held with a stable attitude in a parallel face to the document positioning glass plate 2 with an easy and compact configuration. Thereby, the backlash at the time of moving the reading sensor unit is reduced. As a result, an image reading apparatus capable of obtaining high-quality reading images can be provided. Further, a conventional image reading apparatus needs to urge the horizontal directional contacting portion of the slider to the sliding face of the guide rail by a plurality of elastic members, which are provided other than the elastic member (the elastic member 18 in the present embodiment) urging for positioning the reading sensor unit at a position having a predetermined distance from the document positioning glass plate. Thus, in the conventional image reading apparatus, a driving load increases inevitably. On the other hand, according to the present embodiment, the slider 5 can be pressed toward the guide rail 31 by using the elastic member 18 for pushing-up the reading sensor unit 3. Thus, the image reading apparatus in the present embodiment can reduce the driving load compared to that of the conventional image reading apparatus, thus greatly contributing to increasing a reading speed, and can also reduce the number of parts.

Figure 8:
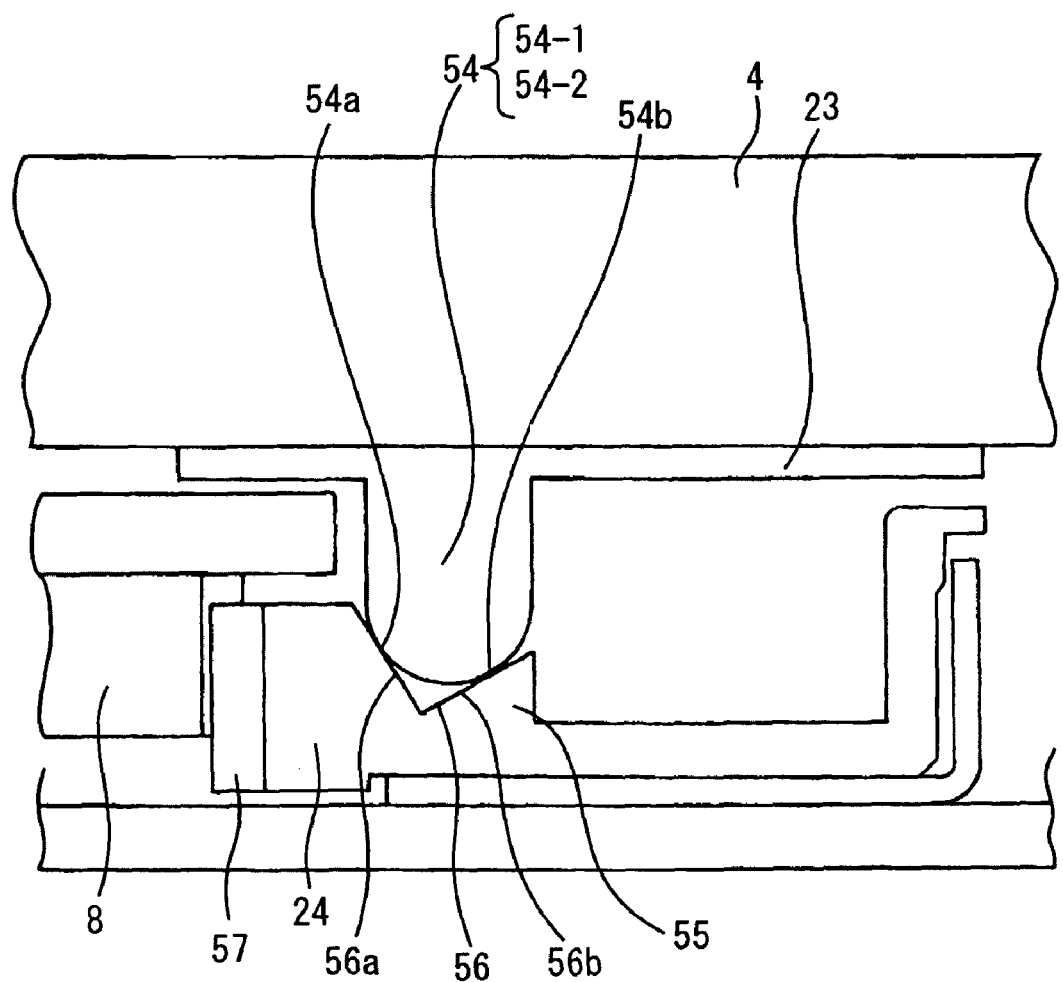
FIG. 8 is a transverse cross sectional view of a contact-sliding structure of a slider and a rack member according a second exemplary embodiment of the present invention.
Figure 9:
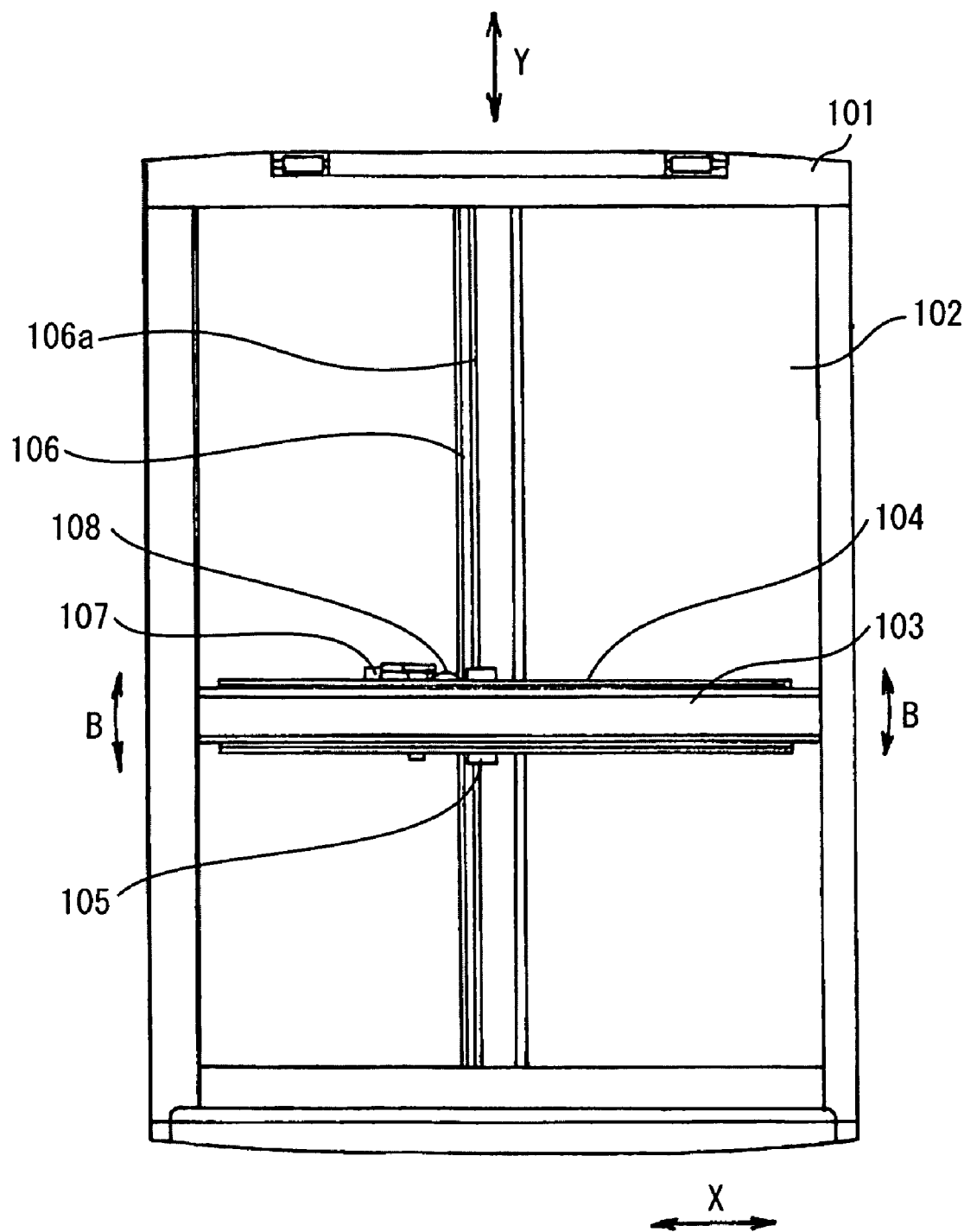
FIG. 9 is a plan view of a conventional image reading apparatus when a document cover is opened.
Figure 10:
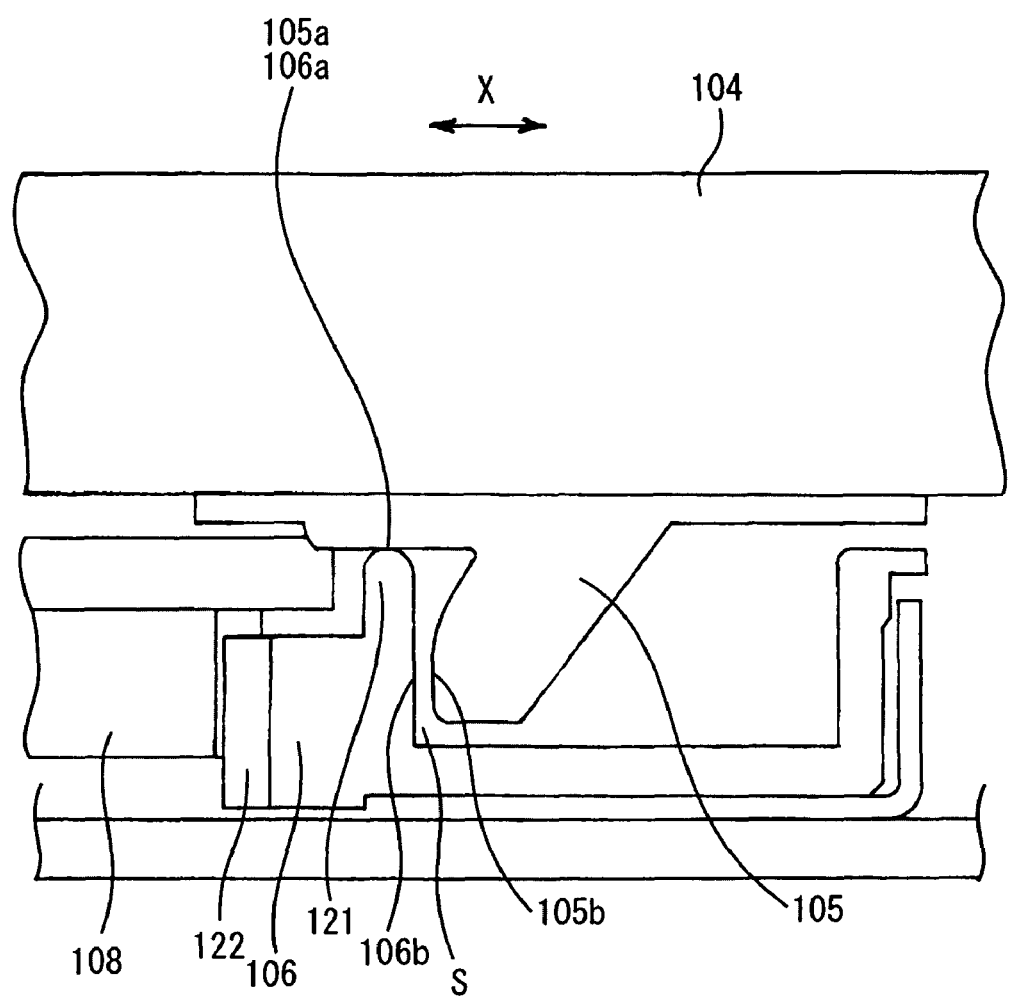
FIG. 10 is a transverse cross sectional view of a conventional image reading apparatus illustrating a sliding portion of a rack member and slider.
Figure 11:
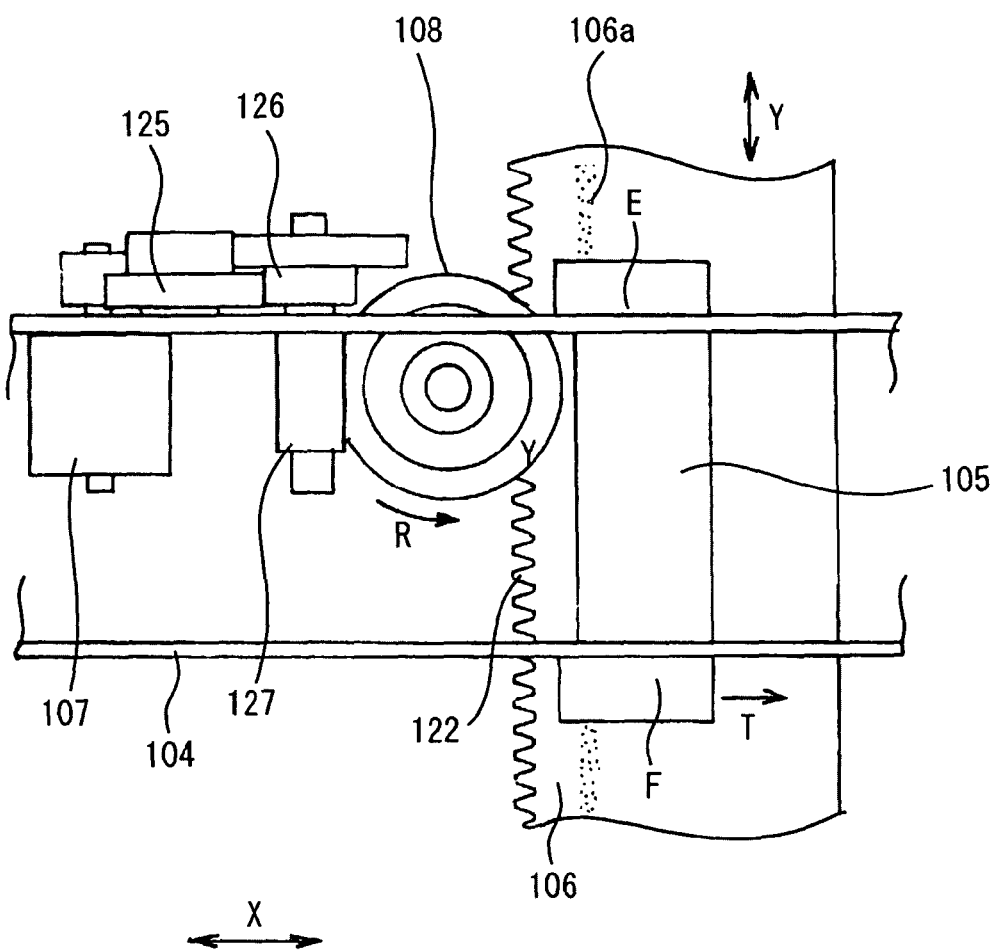
FIG. 11 is a partial plan view of a drive mechanism for a carriage illustrated in FIG. 9.
Figure 12:
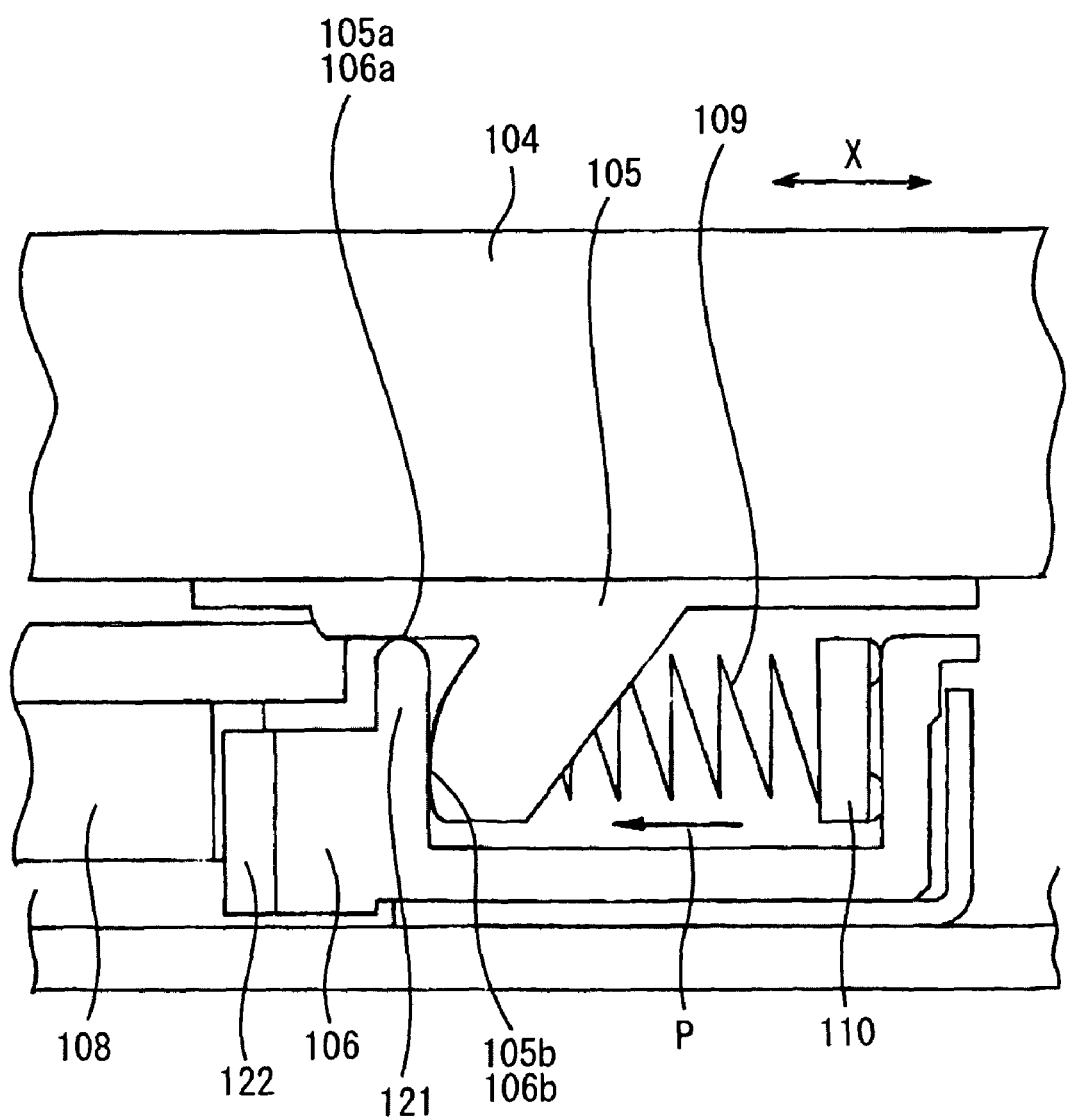
FIG. 12 is a transverse cross sectional view of a sliding portion having an urging member for removing backlash between a rack member and a slider illustrated in FIG. 10.

FIG. 8 is a transverse cross sectional view of a sliding structure of a slider and a rack member according to a second exemplary embodiment of the present invention. In the first exemplary embodiment, the concave portions 51 facing away from the document positioning glass plate 2 are provided at positions having a predetermined interval along the moving direction of the slider 5, and the convex portion 52 facing the document positioning glass plate 2 is provided on the guide rail 31. On the other hand, in the present embodiment, convex portions 54 (54-1, 54-2) facing away from the document positioning glass plate 2 are provided at two portions having a predetermined interval along the moving direction of a slider 23. A guide rail 55 includes a concave portion 56 to contact sliding portions 54a and 54b of the concave portions 54 of the slider 23. In the present embodiment, the concave portion 56 is formed to have a V shape having two inclined faces 56a and 56b.

In the present embodiment, a guide rail 55 is provided near the rack teeth 57 of the rack member 24 in parallel with rack teeth 57, and integrally formed with the rack member 24. As for the concave portion 56 of the guide rail 55, the two inclined faces 56a and 56b contact the two sliding portions 54a and 54b of the slider 23. In the present embodiment, the convex portion 54 has a circular shape. According to this configuration, the convex portions 54 of the slider 23 can contact the concave portion 56 of the guide rail 55 at the two sliding portions 54a and 54b without backlash. Further, when the carriage 4 moves back and forth, backlash does not occur at the sliding portion of the convex portion 54 of the slider 23 and the concave portions 56 of the guide rail 55, and thus play or backlash does not occur at both ends of the reading sensor unit 3. In addition, in each aforementioned embodiment, a cross section of the contact-sliding structure of the slider and the guide rail has a combination of a circular shape and a V shape. However, the cross section can have a combination of any other arbitrary shapes if the shape can prevent the backlash of the contact-sliding portion using the pressing reaction force by the elastic member 18 and the self-weight of the reading sensor unit 3.

In the present embodiment, the slider 23 can be pressed toward the guide rail 55 by using the elastic member 18 for pushing-up the reading sensor unit 3. Thus, the image reading apparatus according to the present embodiment can reduce the driving load compared to that of the conventional image reading apparatus, thus greatly contributing to an increase of reading speed, and can also reduce the number of parts. Therefore, the sensor unit 3 can be held with a stable attitude in a parallel face to the document positioning glass plate 2 with an easy and compact configuration. Thereby, the image reading apparatus capable of acquiring high-quality reading images is realized by reducing backlash while the reading sensor unit 3 is moving.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-018782 filed Jan. 30, 2008, which is hereby incorporated by reference herein in its entirety.

What is claimed is:

1. An image reading apparatus for reading a document placed on a document positioning plate comprising:
   a carriage movable along a first direction, the carriage having a shape extending along a second direction perpendicular to the first direction between a first side and a second side;
   a reading sensor unit mounted on the carriage, the reading sensor unit having a shape extending along the second direction;
   a rack member provided in an apparatus body and having rack teeth disposed along the first direction;
   a pinion gear rotatably disposed on the carriage and meshed with the rack teeth;
   a motor mounted on the carriage and driving the pinion gear;
   an urging member disposed between the carriage and the reading sensor unit, wherein the urging member is disposed at the first side and is not disposed at the second side; and
   a guide rail provided in the apparatus body and guiding movement of the carriage,
   wherein the carriage has a guide portion provided between the first side and the second side and engaged with the guide rail, and
   wherein the guide portion is pressed toward the guide rail by receiving a reaction force of the urging member, the urging member urges the reading sensor unit at the first side toward the document positioning plate, and the carriage urged by the reaction force urges the reading sensor unit at the second side toward the document positioning plate.

2. The image reading apparatus according to claim 1, wherein the guide rail includes a convex portion facing the document positioning plate, and
   wherein the guide portion includes a concave portion sliding on the convex portion facing away from the document positioning plate.

3. The image reading apparatus according to claim 2, wherein the convex portion is provided near the rack teeth.

4. The image reading apparatus according to claim 2, wherein the convex portion is formed integrally with the rack teeth.

5. The image reading apparatus according to claim 2, wherein the concave portion is pressed toward the convex portion by a reaction force caused by the urging member.

6. The image reading apparatus according to claim 1, wherein the guide rail includes a concave portion facing the document positioning plate, and
   wherein the guide portion includes a convex portion sliding on the concave portion facing away from the document positioning plate.

7. The image reading apparatus according to claim 6, wherein the concave portion is provided near the rack teeth.

8. The image reading apparatus according to claim 6, wherein the concave portion is formed integrally with the rack teeth.

9. The image reading apparatus according to claim 6, wherein the convex portion is pressed toward the concave portion by the reaction force caused by the urging member.

10. The image reading apparatus according to claim 1, wherein the reading sensor unit includes a first spacer provided at the first side that contacts with the document positioning plate and a second spacer provided at the second side that contacts with the document positioning plate.

* * * * *